(12) United States Patent
Guernsey et al.

(10) Patent No.: US 12,145,804 B2
(45) Date of Patent: Nov. 19, 2024

(54) CONVEYOR BELT MODULE WITH WEAR PADS

(71) Applicant: Laitram, L.L.C., Harahan, LA (US)

(72) Inventors: Kevin W. Guernsey, Destin, FL (US); David W. Bogle, Franklinton, LA (US); Catherine M. Bishop, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 18/373,084

(22) Filed: Sep. 26, 2023

(65) Prior Publication Data

US 2024/0025652 A1    Jan. 25, 2024

Related U.S. Application Data

(63) Continuation of application No. 17/601,893, filed as application No. PCT/US2020/026674 on Apr. 3, 2020, now Pat. No. 11,772,897.

(60) Provisional application No. 62/837,819, filed on Apr. 24, 2019.

(51) Int. Cl.
  *B65G 17/30* (2006.01)
  *B65G 17/08* (2006.01)
  *B65G 17/40* (2006.01)

(52) U.S. Cl.
  CPC ............ *B65G 17/30* (2013.01); *B65G 17/08* (2013.01); *B65G 17/40* (2013.01); *B65G 2207/12* (2013.01); *B65G 2207/30* (2013.01); *B65G 2207/48* (2013.01)

(58) Field of Classification Search
  None
  See application file for complete search history.

(56) References Cited

U.S. PATENT DOCUMENTS

| | | |
|---|---|---|
| 4,832,187 A | 5/1989 | Lapeyre |
| 4,925,016 A | 5/1990 | Lapeyre |
| 4,934,517 A | 6/1990 | Lapeyre |
| 4,949,838 A | 8/1990 | Lapeyre et al. |
| 4,953,693 A | 9/1990 | Draebel |
| 4,971,191 A | 11/1990 | Lapeyre |
| 4,974,724 A | 12/1990 | Lapeyre |
| 5,105,938 A | 4/1992 | Tan |
| 5,377,819 A | 1/1995 | Horton et al. |
| 5,507,383 A | 4/1996 | Lapeyre et al. |
| 5,598,916 A | 2/1997 | Horton et al. |
| 5,850,902 A | 12/1998 | Hicks et al. |
| 5,921,379 A | 7/1999 | Horton |
| 6,814,223 B1 | 11/2004 | Verdigets et al. |
| 6,859,516 B2 | 2/2005 | Verdigets |

(Continued)

FOREIGN PATENT DOCUMENTS

DE    10027229 A1 * 12/2001  ............. B65G 17/08
WO    2017062430 A1    4/2017

OTHER PUBLICATIONS

Extended European Search Report, Application No. EP20796002.2, mailed Dec. 23, 2022, European Patent Office, Munich, Germany.

*Primary Examiner* — Kavel Singh
(74) *Attorney, Agent, or Firm* — James T. Cronvich

(57) ABSTRACT

Belt modules with wear pads for constructing modular plastic conveyor belts. A conveyor belt made of the modules is supported in the carryway of a conveyor atop linear wearstrips along which the belt's wear pads slide as the belt advances.

21 Claims, 4 Drawing Sheets

(56) References Cited

U.S. PATENT DOCUMENTS

| | | |
|---|---|---|
| 7,073,662 B2 | 7/2006 | Neely et al. |
| 7,575,113 B2 | 8/2009 | Sedlacek et al. |
| 7,832,549 B2 | 11/2010 | Honeycutt |
| 7,980,385 B2 | 7/2011 | Guernsey |
| 8,464,862 B2 | 6/2013 | Honeycutt et al. |
| 8,579,104 B2 | 11/2013 | Weiser et al. |
| 8,776,998 B2 | 7/2014 | Weiser et al. |
| 8,863,944 B2 | 10/2014 | MacLachlan |
| 9,254,964 B2 | 2/2016 | Oertling |
| 9,409,721 B2 | 8/2016 | Musick et al. |
| 9,550,628 B2 | 1/2017 | Wunsch |
| 9,663,298 B2 * | 5/2017 | MacLachlan .......... B65G 17/08 |
| 2010/0258410 A1 | 10/2010 | Wunsch |
| 2016/0200520 A1 | 7/2016 | Menke et al. |

\* cited by examiner

CONVEYOR BELT MODULE WITH WEAR PADS

CROSS-REFERENCE TO RELATED APPLICATIONS

This application is a continuation of co-pending U.S. patent application Ser. No. 17/601,893, filed Oct. 6, 2021, now U.S. Pat. No. 11,772,897, issued Oct. 3, 2023, which is a 371 of PCT/US2020/026674, international filing date Apr. 3, 2020, which claims the benefit of U.S. Provisional Patent Application No. 62/837,819, filed Apr. 24, 2019.

TECHNICAL FIELD

The invention relates generally to power-driven conveyors and in particular to modules for modular plastic conveyor belts.

BACKGROUND

Modular plastic conveyor belts constructed of rows of plastic belt modules joined together end to end at hinge joints are used to convey products in many industrial applications. The belts are supported in product carryways by wearstrips, typically made of UHMW. As the belts ride along the wearstrips, sliding friction between the undersides of the belts and the wearstrips causes the belts to wear. Excessive wear weakens the belt and shortens its effective life.

SUMMARY

One version of a conveyor belt module embodying features of the invention comprises a module body that extends in length from a first end to a second end, in width from a first side to a second side, and in thickness from a top side to a bottom side. First hinge elements are spaced apart laterally along the first end of the module body, and second hinge elements are spaced apart laterally along the second end of the module body. Drive faces extend laterally along the bottom side of the module body. One or more wear pads on the bottom side of the module body are laterally offset from the drive faces. The wear pads each have a wear surface at the bottom side. The area of the wear surface of each of the wear pads is greater than the area of any of the first and second hinge elements at the bottom side.

Another version of a conveyor belt module comprises a module body that extends in length from a first end to a second end, in width from a first side to a second side, and in thickness from a top side to a bottom side. First hinge elements are spaced apart laterally along the first end of the module body, and second hinge elements are spaced apart laterally along the second end of the module body. Drive faces extend laterally along the bottom side of the module body. Wear pads on the bottom side of the module body are laterally offset from the drive faces. The wear pads each have a wear surface at the bottom side made of a different material from the rest of the module body.

In another aspect a conveyor embodying features of the invention comprises a modular conveyor belt constructed of a series of rows of one or more belt modules hingedly connected end to end at hinge joints between consecutive rows. At least some of the rows include drive faces that extend laterally along a bottom side of the modular conveyor belt and wear pads on the bottom side of the modular conveyor belt laterally offset from the drive faces. The wear pads each have a wear surface at the bottom side of the modular conveyor belt. An upper carryway includes wearstrips spaced apart across the width of the carryway. The wearstrips extend linearly along the length of the carryway to support the modular conveyor belt. A drive element engages the drive faces to drive the modular conveyor belt in a direction of belt travel along the carryway. The wear pads on the bottom side of the modular conveyor belt are arranged in columns aligned with the wearstrips so that the wear surfaces ride on the wearstrips as the modular conveyor belt is driven in the direction of belt travel.

DETAILED DESCRIPTION

Figure 1:
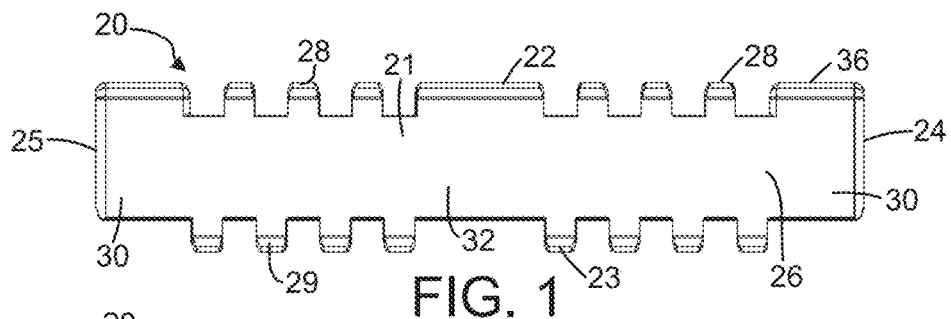
FIG. 1 is a top plan view of a plastic conveyor belt module embodying features of the invention including a wear pad.
Figure 2:
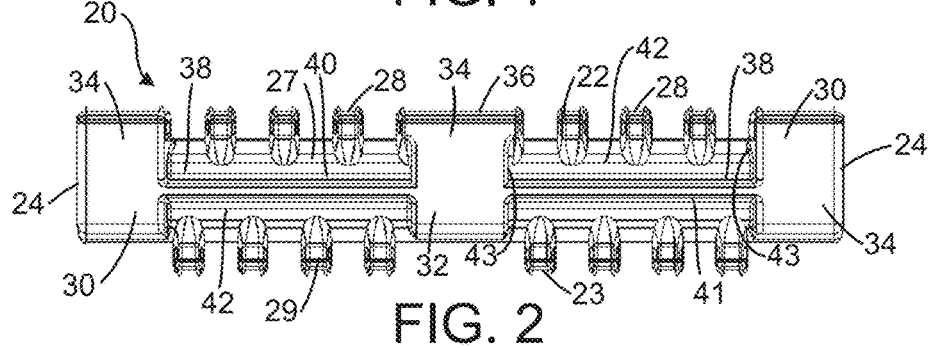
FIG. 2 is a bottom plan view of the module of FIG. 1.

FIGS. 1 and 2 are top and bottom views of a conveyor belt module embodying features of the invention. The module 20 is a plastic belt module molded out of a thermoplastic polymer, such as polyethylene, polypropylene, acetal, or a composite polymer. The module body extends in length from a first end 22 to a second end 23, in width from a first side 24 to a second side 25, and in thickness from a top side 26 to a bottom side 27. The top side 26 has a conveying surface 21, and the bottom side 27 is the drive side. A plurality of first hinge elements 28 are spaced apart laterally across the width of the module body 20 aligned along the first end 22. A plurality of second hinge elements 29 are spaced apart laterally aligned along the second end 23 of the module body 20. In this version the first and second hinge elements are the same width. But their widths could differ. The first hinge elements 28 are laterally offset from the second hinge elements 29 to facilitate the construction of a conveyor belt from the modules 20.

The belt module 20 shown in FIGS. 1 and 2 has three wear pads: two outside wear pads 30 and an interior wear pad 32. Of course, a module could have more than one interior wear pad, such as in the case of a wider belt module. Or a small module, such as an edge module, could have only a single wear pad. The wear pads 30, 32 have a wear surface 34 at the bottom side 27 of the module body 20. In this version the wear surface 34 is a flat closed surface. But in other versions the wear surface 34 could be interrupted by holes, slits, or other openings that extend through the thickness of the wear pads to provide passages for airflow or drainage, for example. The interior wear pad 32 includes a pad hinge element 36 at the first end 22 of the module 20. The pad hinge element 36 is aligned with the first hinge elements 28 but is distinguished from the first hinge elements by providing a continuation of the wear pad's wear surface 34 at the module's bottom side 27 and of the conveying surface 21 at the module's top side 26. In this version the lateral extent and the area of the wear surface 34 of each of the wear pads 30, 32 are greater than the lateral extent and the bottom area of any of the first and second hinge elements 28, 29 and of any other individual structural elements on the bottom side 27 of the module body 20, other than the pad hinge element 36. The lateral extent of the pad hinge element 36 is at least as wide as the wear surface 34.

Drive bars 38 are laterally elongated along the bottom side 27 of the module body 20. The drive bars 38 form drive faces 40, 41 on one or both sides that can receive a drive force from a drive sprocket. In the depicted version the drive bars 38 are centrally located midway between the first and second ends 22, 23 of the module body 20. But they could be located closer to one of the ends than to the other. Or, instead of being formed on drive bars, the drive faces could be formed on the leading or training walls of drive pockets at the bottom side of the module. The drive bars 38 shown in FIG. 2, which extend laterally from one of the wear pads 30 to another 32, are laterally offset from the wear pads 30, 32. And the drive bars 38 extend downward to the same level as the wear surfaces 34 of the wear pads 30, 32 in this version, in which that level is the bottom-most level of the module. But the drive bars 38 could terminate inward of the wear surfaces 34. Recessed regions 42 at the bottom side 27 between the drive bars 38 and the hinge elements 28, 29 permit access to drive-sprocket teeth to engage the drive faces 40, 41 of the drive bars. End walls 43 of the recessed regions 42 formed by the wear pads 30, 32 limit the lateral wander of a conveyor belt constructed of the modules 20 by confining an axially fixed sprocket to the recessed region to provide belt tracking.

Figure 3:
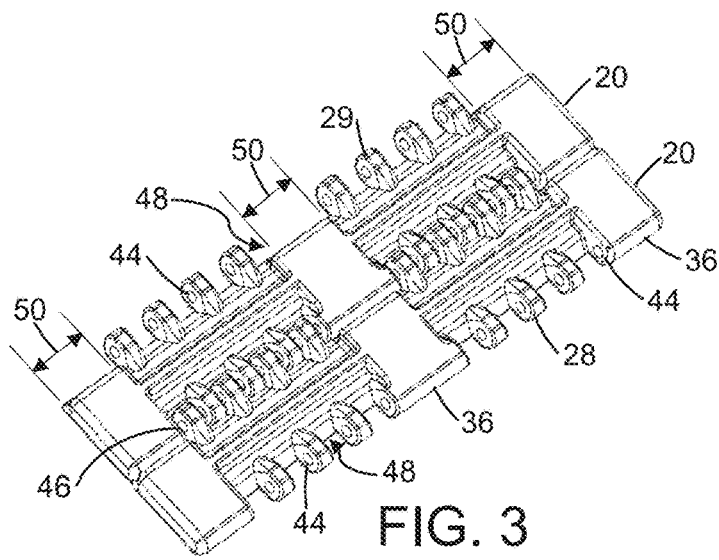
FIG. 3 is an isometric view of the bottom sides of two modules as in FIG. 2 joined together.
Figure 4:
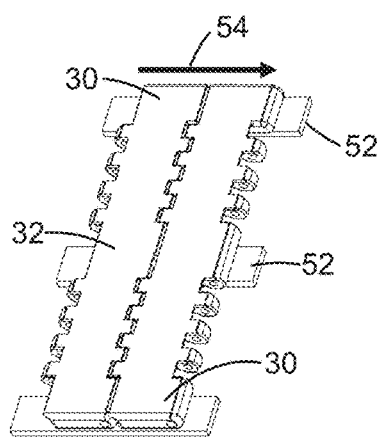
FIG. 4 is an oblique view of the top sides of the modules of FIG. 3 atop wearstrips.

Consecutive conveyor belt modules 20 are connected end to end as shown in FIG. 3 to form a conveyor belt. The first hinge elements 28 and the pad hinge elements 36 interleave with the second hinge elements 29 of a consecutive module 20. In this version, the interleaved hinge elements 28, 29, 36 have aligned openings 44 that receive a hinge rod to form a hinge joint 46 connecting consecutive rows of modules. Spaces 48 between consecutive hinge elements 28, 29, 36 are slightly wider than the hinge elements to receive the hinge elements of the connected row of belt modules. When the modules are connected, the wear pads 30, 32 are arranged in laterally spaced columns 50 that extend along the length of the belt.

As shown in FIG. 3, the columns of wear pads 30, 32 align with and ride on linear wearstrips 52 that extend along the length of the upper conveyor carryway. The wearstrips 52 support the belt in the carryway and provide a sliding surface along which the wear surfaces of the wear pads ride as the belt is driven in a direction of belt travel 54. Thus, the wear pads 30, 32 are the only part of the belt in contact with the wearstrips 52.

Figure 5:
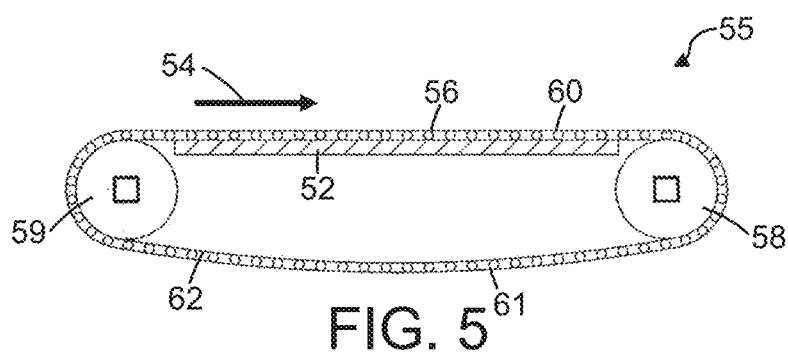
FIG. 5 is a side elevation view of a modular plastic belt conveyor constructed of modules as in FIG. 1.

An endless conveyor belt loop constructed of linked conveyor belt modules as in FIGS. 1-4 is shown in a conveyor 55 in FIG. 5. The belt 56 is trained around drive and idle sprockets 58, 59. Teeth on the sprockets engage the drive faces of the modules to drive the belt 56 in the direction of belt travel 54. The belt 56 is shown supported by wearstrips 52 on the upper carryway 50. The belt 56 returns from the drive sprockets 58 to the idle sprockets 59 along a lower returnway 61. Each belt row 62 may include one or more belt modules 20 as in FIGS. 1-4, including laterally shortened versions of those modules in a bricklaid belt pattern.

Figure 6:
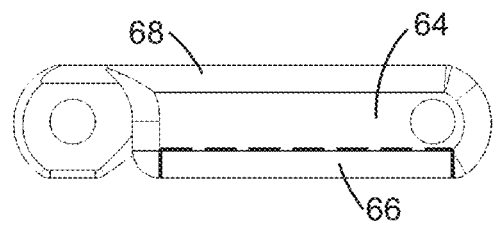
FIG. 6 is a side elevation view of a module as in FIG. 1 in which the wear surface is made of a different material from the rest of the module.

Because the wear pads slide on the wearstrips, they are subjected to greater frictional wear than the rest of the module body. FIG. 6 shows a wear pad 64 whose bottom wear surface 66 is made of a wear-resistant material, such as nylon, acetal, PEEK, and UHMW, permanently fastened to the module body 68 by overmolding, co-molding, ultrasonic welding, gluing, or mechanical attachment, for example. The wear-resistant material may be chosen for its durability or its low-friction properties and may allow the wearstrips to be made of stainless steel. The rest of the module body 68 is made of a different thermoplastic material such as polyethylene, polypropylene, acetal, or other polymeric materials conventionally used to make plastic conveyor belt modules.

Figure 7:
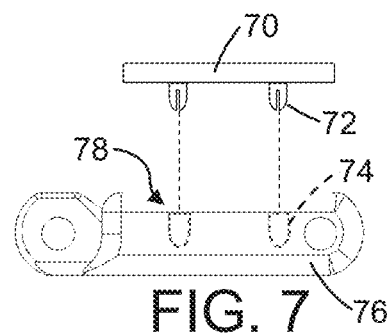
FIG. 7 is an exploded side elevation view of a module as in FIG. 1 with a detachable wear surface.

A detachable wear surface 70 is shown in FIG. 7. The wear surface 70 has attachment elements in the form of expandable tabs 72 that mate with attachment elements in the form of receptacles 74. In this example the tabs 72 snap into place in the receptacles 74. But any sort of mating attachment elements that releasably fasten in any way may be used to allow for easy replacement of a worn wear surface 70. The wear surface 70 may be made of a wear-resistant material. The module body 76 has a recess 78 at the bottom in which the wear surface 70 resides.

Figure 8:
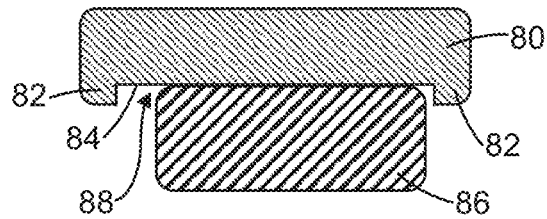
FIG. 8 is a front elevation cross section of a wear strip supporting a wear pad as in FIG. 4 in which the wear pad has guides.

FIG. 8 shows another version of a wear pad. In this version the wear pad 80 has depending guides 82 at each side flanking a wear surface 84 riding along a wearstrip 86. The guides 82 limit lateral wander of the conveyor belt to the width of the slot 88 formed between the two depending guides 82. Thus, the guides 82 provide belt tracking.

Figure 9:
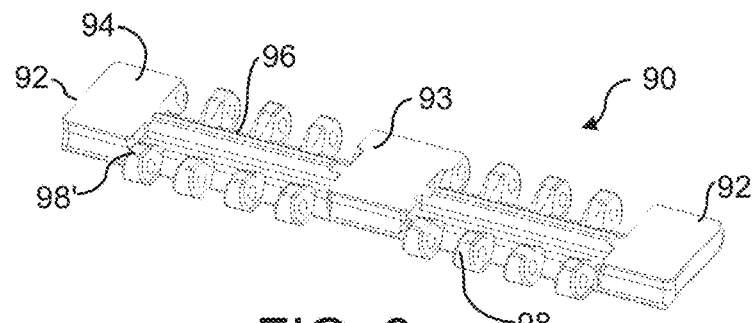
FIG. 9 is an axonometric view of the bottom side of another version of a conveyor belt module embodying features of the invention.
Figure 10:
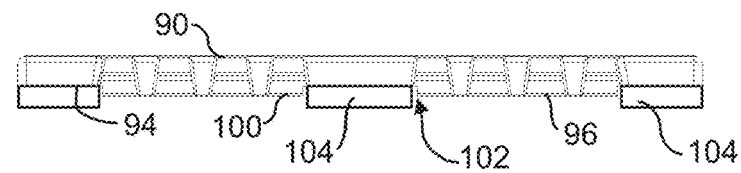
FIG. 10 is a front elevation view of a belt module as in FIG. 9 supported on wearstrips.

Another version of a conveyor belt module is shown in FIG. 9. The belt module 90 has outer wear pads 92 and an inner wear pad 93 whose wear surfaces 94 are at a different level from the bottoms of the drive bar 96 and the hinge elements 98, which define the bottom-most level of the module. Otherwise the module 90 is like the belt module 20 of FIGS. 1 and 2. Because the wear surfaces 94 of the wear pads 92, 93 are indented upward from the bottom-most level 100 of the module 90 as shown in FIG. 10, a conveyor belt constructed of the modules 90 forms a longitudinal slot 102 in which wear strips 104 are received. The downward extension of the drive bars 96 and the hinge elements 98' bounding the wear pads 92, 93 past their indented wear surfaces 94 limits lateral wander of the conveyor belt by contact with the sides of the wear strips 104.

Figure 11:
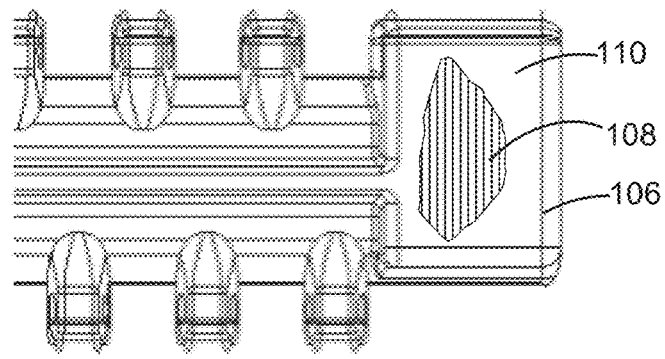
FIG. 11 is an enlarged bottom plan view of the outer side of a module as in FIG. 2 partly cut away to show a wear indicator.
Figure 12:
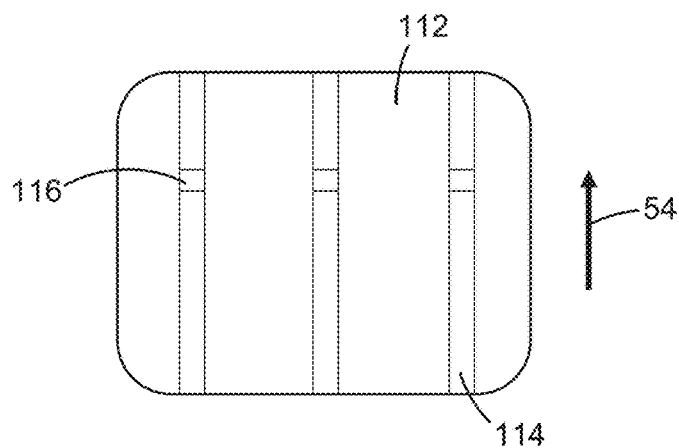
FIG. 12 is a bottom plan view of a wear pad as in FIG. 1 with a grooved bottom with a wear indicator.

FIGS. 11 and 12 show two examples of wear indicators built into wear pads. In FIG. 11 a wear pad 106 has an internal layer 108 of a different color than the original outer wear surface 110. As the wear surface 110 wears, the internal layer of a different color becomes visible to indicate wear of the wear pad 106. In FIG. 12 a wear surface 112 is interrupted by grooves 114 that are elongated in the direction of belt travel 54. Slightly raised portions 116 of the base of the grooves serve as wear indicators like those in tire treads. As the wear surface 112 wears, the distance from the top of the wear indicators 116 to the worn wear surface decreases so that wear can be identified, and corrective action taken.

Figure 13A:
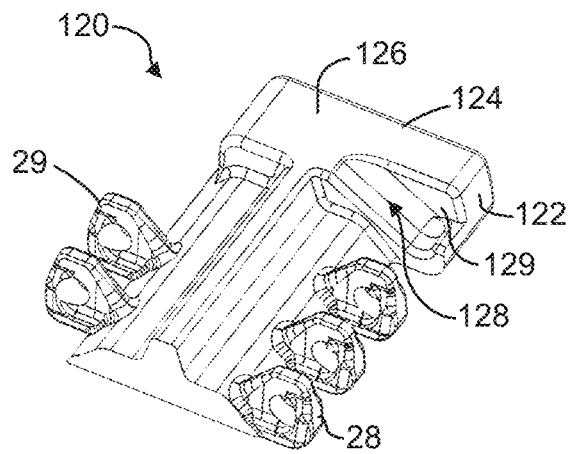
FIGS. 13A and 13B are bottom and top isometric views of a version of a belt edge module embodying features of the invention.
Figure 13B:
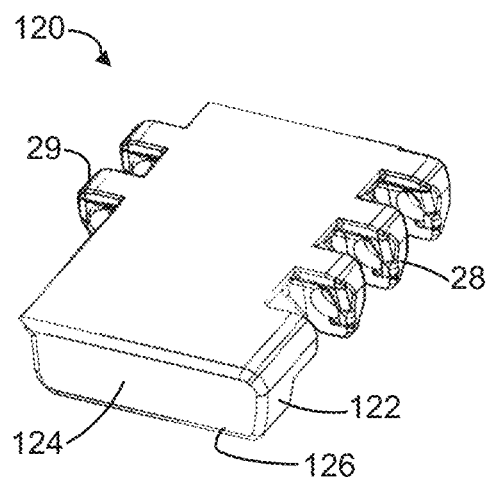

Another version of a belt module with a different outside edge is shown in FIGS. 13A and 13B. The module 120 is shown as an edge module with a wear pad 122 at an outer side 124 and suitable for constructing a bricklaid conveyor belt. But a wider module with a similar outer side at the other side, with or without interior wear pads, could be made for constructing non-bricklaid belts having a single module forming each belt row. The module 120 has first and second hinge elements 28, 29 and a drive bar 38 like the module of FIG. 2. The wear pad 122 has a slot 128 extending at an angle from the wear pad's wear surface 126 along an inner wall 129 of the wear pad for a rod-removal tool, such as a screwdriver, to access the end of a hinge rod and bend it away from a stop formed by the inner wall and toward the level of the wear surface so that the rod can be removed from the hinge elements. The inner wall 129, which presents a stop that is in line with and faces the line of first hinge elements 28, prevents the hinge rod from working its way out of the line of hinge elements during operation of the conveyor belt. The lateral extent and the area of the wear surface of the wear pad 122 are greater than those of the hinge elements 28, 29.

Figure 14A:
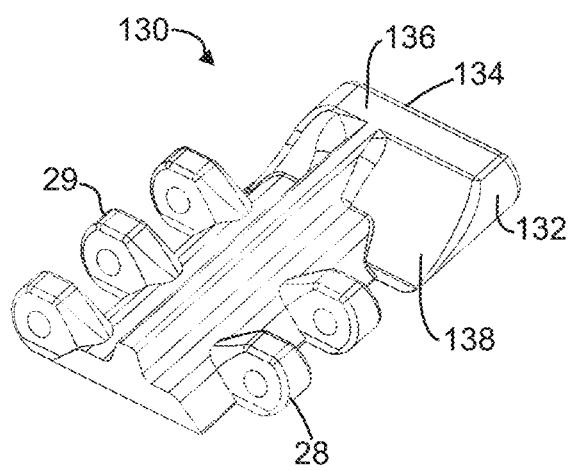
FIGS. 14A and 14B are bottom and top axonometric views of another version of an edge module embodying features of the invention.
Figure 14B:
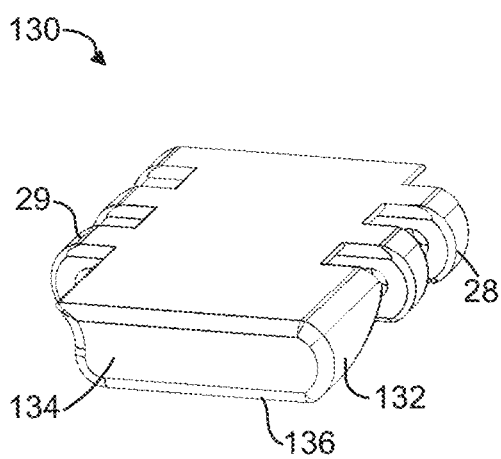

A belt module 130 with another version of a wear pad 132 at an outer side 134 is shown in FIGS. 14A and 14B. The wear pad's wear surface at the bottom of the module 130 has a lateral extent and an area greater than those of first and second hinge elements 28, 29. The wear pad 132 tapers away from the wear surface 136 along a ramp 138 in line with and facing the aligned first hinge elements 28. The ramp 138 is shown as concavely curved but could also be flat. The ramp 138 provides a slide surface along which the end of a hinge rod can slide when the rod is pushed out through the hinge elements during manual removal. Like the module of FIGS. 13A and 13B, the belt module 130 can be a narrow edge module as shown or it can be a wider module with similar wear pads 132 at both outer sides.

What is claimed is:

1. A conveyor belt module extending in length from a first end to a second end, laterally in width from a first side to a second side, and in thickness from a top side to a bottom side and comprising:
    a plurality of first hinge elements spaced apart laterally along the first end of the conveyor belt module;
    a plurality of second hinge elements spaced apart laterally along the second end of the conveyor belt module;
    one or more wear pads each including:
        a wear surface at the bottom side of the conveyor belt module;
        a pad hinge element on the first end of the conveyor belt module aligned with and wider than the first hinge elements.

2. A conveyor belt module as claimed in claim 1 wherein the pad hinge element at the first end of the conveyor belt module forms a continuation of the wear surface of the wear pad and whose lateral extent is at least as wide as the lateral extent of the wear pad.

3. A conveyor belt module as claimed in claim 1 comprising drive faces formed on elongated drive bars that extend laterally from one of the wear pads to another of the wear pads.

4. A conveyor belt module as claimed in claim 1 wherein a portion of the wear pads including the wear surface is made of a wear-resistant material and the rest of the conveyor belt module is made of a different material.

5. A conveyor belt module as claimed in claim 1 wherein a portion of the wear pads including the wear surface includes a wear indicator that indicates wear of the wear surface.

6. A conveyor belt module as claimed in claim 5 wherein the wear surface includes one or more grooves and the wear indicator comprises a raised portion of the base of the grooves.

7. A conveyor belt module as claimed in claim 5 wherein the wear indicator comprises a layer of the wear pad interior of the wear surface that differs in color from the wear surface when not worn.

8. A conveyor belt module as claimed in claim 1 wherein the wear surface of the wear pads is a closed surface.

9. A conveyor belt module as claimed in claim 1 wherein the wear surfaces of the wear pads define the bottom-most level of the bottom side of the conveyor belt module.

10. A conveyor belt module as claimed in claim 1 wherein the wear surfaces of the wear pads are indented upward from the bottom-most level of the bottom side of the conveyor belt module.

11. A conveyor belt module extending in length from a first end to a second end, laterally in width from a first side to a second side, and in thickness from a top side to a bottom side and comprising:
    a plurality of first hinge elements spaced apart laterally along the first end of the conveyor belt module;
    a plurality of second hinge elements spaced apart laterally along the second end of the conveyor belt module;
    drive faces extending laterally along the bottom side of the conveyor belt module between the first and second ends;
    one or more wear pads each including a wear surface at the bottom side of the conveyor belt module laterally offset from the drive faces and the second hinge elements;
    wherein the area of the wear surface of each of the one or more wear pads is greater than the area of any of the first and second hinge elements at the bottom side of the conveyor belt module.

12. A conveyor belt module as claimed in claim 11 wherein each of the one or more wear pads includes a pad hinge element aligned with the first hinge elements at the first end of the conveyor belt module, wherein the pad hinge element forms a continuation of the wear surface of the wear pad and whose lateral extent is at least as wide as the lateral extent of the wear pad.

13. A conveyor belt module as claimed in claim 11 wherein the wear surfaces of the wear pads define the bottom-most level of the bottom side of the conveyor belt module.

14. A conveyor belt module as claimed in claim 11 wherein the wear surfaces of the wear pads are indented upward from the bottom-most level of the bottom side of the conveyor belt module.

15. A conveyor belt module as claimed in claim 11 wherein one of the wear pads forms the first side of the conveyor belt module and has an inner wall forming a stop in line with and facing the first hinge elements.

16. A conveyor belt module as claimed in claim 11 wherein one of the wear pads forms the first side of the conveyor belt module and has a ramp in line with and facing the first hinge elements and extending to the wear surface of the wear pad.

17. A conveyor belt module extending in length from a first end to a second end, laterally in width from a first side to a second side, and in thickness from a top side to a bottom side and comprising:
   a plurality of first hinge elements spaced apart laterally along the first end of the conveyor belt module;
   a plurality of second hinge elements spaced apart laterally along the second end of the conveyor belt module;
   wear pads spaced apart laterally across the width of the conveyor belt module, each wear pad including a wear surface at the bottom side of the conveyor belt module;
   drive bars having drive faces extending laterally along the bottom side of the conveyor belt module between the first and second ends and from wear pad to wear pad;
   wherein one of the wear pads forms the first side of the conveyor belt module and has a ramp in line with and facing the first hinge elements and extending to the wear surface of the wear pad.

18. A conveyor belt module as claimed in claim 17 wherein the wear surfaces of the wear pads are indented upward from the bottom-most level of the bottom side of the conveyor belt module.

19. A conveyor belt module extending in length from a first end to a second end, laterally in width from a first side to a second side, and in thickness from a top side to a bottom side and comprising:
   a plurality of first hinge elements spaced apart laterally along the first end of the conveyor belt module;
   a plurality of second hinge elements spaced apart laterally along the second end of the conveyor belt module;
   wear pads spaced apart laterally across the width of the conveyor belt module, each wear pad including a wear surface at the bottom side of the conveyor belt module;
   drive bars having drive faces extending laterally along the bottom side of the conveyor belt module between the first and second ends and from wear pad to wear pad;
   wherein the drive bars extend to the same level as the wear surfaces defining the bottom-most level of the bottom side of the conveyor belt module.

20. A conveyor belt module as claimed in claim 19 wherein one of the wear pads forms the first side of the conveyor belt module and has an inner wall forming a stop in line with and facing the first hinge elements.

21. A conveyor belt module extending in length from a first end to a second end, laterally in width from a first side to a second side, and in thickness from a top side to a bottom side and comprising:
   a plurality of first hinge elements spaced apart laterally along the first end of the conveyor belt module;
   a plurality of second hinge elements spaced apart laterally along the second end of the conveyor belt module;
   wear pads spaced apart laterally across the width of the conveyor belt module, each wear pad including a wear surface at the bottom side of the conveyor belt module;
   drive bars having drive faces extending laterally along the bottom side of the conveyor belt module between the first and second ends and from wear pad to wear pad;
   wherein the first and second hinge elements extend to the same level as the wear surfaces defining the bottom-most level of the bottom side of the conveyor belt module.

* * * * *